United States Patent
Chen

(10) Patent No.: US 7,722,517 B2
(45) Date of Patent: May 25, 2010

(54) PLASTIC BAG SEALING DEVICE

(76) Inventor: Chun-Shan Chen, P.O. Box 90, Tainan City 70499 (TW)

( * ) Notice: Subject to any disclaimer, the term of this patent is extended or adjusted under 35 U.S.C. 154(b) by 158 days.

(21) Appl. No.: 12/036,293

(22) Filed: Feb. 25, 2008

(65) Prior Publication Data

US 2009/0215601 A1    Aug. 27, 2009

(51) Int. Cl.
*B31B 1/64* (2006.01)

(52) U.S. Cl. .............. 493/208; 493/189; 493/194; 493/195; 493/196; 493/197; 493/202

(58) Field of Classification Search ............ 493/208, 493/189, 193–197, 199, 202, 205
See application file for complete search history.

(56) References Cited

U.S. PATENT DOCUMENTS

| | | | | |
|---|---|---|---|---|
| 4,332,578 | A * | 6/1982 | van der Meulen | 493/197 |
| 4,436,576 | A * | 3/1984 | Seiden | 156/543 |
| 4,490,131 | A * | 12/1984 | Coleman et al. | 493/217 |
| 4,557,713 | A * | 12/1985 | Savich | 493/194 |
| 4,632,667 | A * | 12/1986 | McDonald et al. | 493/187 |
| 4,642,084 | A * | 2/1987 | Gietman, Jr. | 493/190 |
| 4,934,993 | A * | 6/1990 | Gietman, Jr. | 493/11 |
| 5,292,299 | A * | 3/1994 | Anderson et al. | 493/11 |
| 5,365,815 | A * | 11/1994 | Pfaff, Jr. | 83/154 |
| 5,588,944 | A * | 12/1996 | Achelpohl et al. | 493/205 |
| 6,089,753 | A * | 7/2000 | Belias et al. | 383/8 |
| 6,117,058 | A * | 9/2000 | Sauder et al. | 493/193 |
| 6,352,497 | B1 * | 3/2002 | Hensley et al. | 493/22 |
| 6,635,139 | B2 * | 10/2003 | Bohn et al. | 156/251 |
| 6,648,044 | B2 * | 11/2003 | Bohn et al. | 156/515 |

* cited by examiner

*Primary Examiner*—Christopher Harmon

(57) ABSTRACT

A plastic bag sealing device includes a work table, a sealing device having a silicon rubber roller, a material intake press roller and a material outlet press roller fixed beside the silicon rubber roller to press thereon, plural rotating shafts fixed outside around the silicon rubber roller and respectively mounted with a sealing blade, plural guide rollers employed to conduct plastic bags, a dot-cutting device, an opening-cutting device, and a press roller fixed beside the dot-cutting device and the opening-cutting device. With the sealing blades to carry out multiple sealing at the same location, a plastic bag can be quickly and firmly sealed, and with the dot-cutting device and the opening-cutting device installed on the work table to respectively execute dot-cutting and opening-cutting, the work table can be comparatively downsized, thus greatly elevating economic gain.

2 Claims, 6 Drawing Sheets

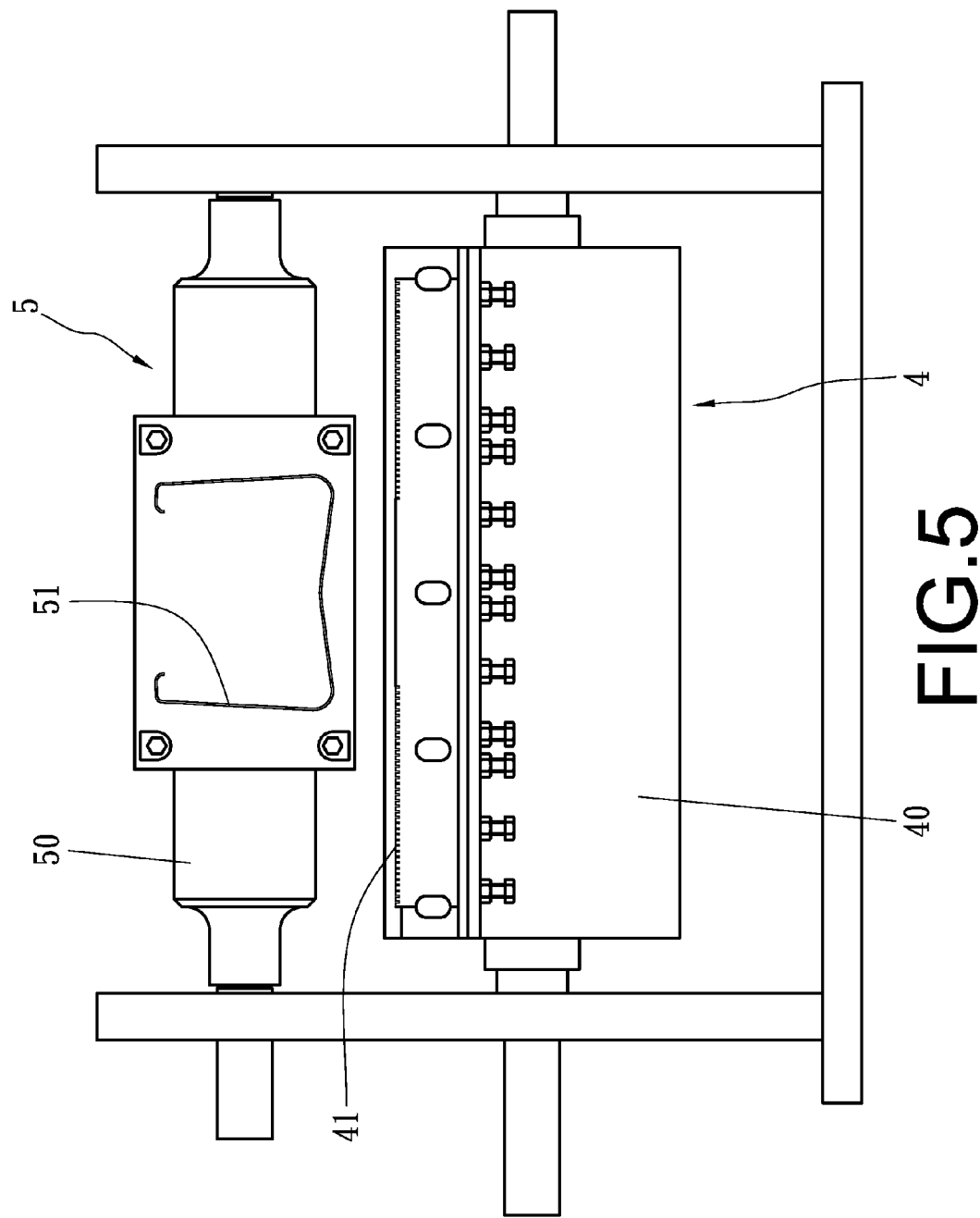

PLASTIC BAG SEALING DEVICE

BACKGROUND OF THE INVENTION

1. Field of the Invention

This invention relates to a plastic bag sealing device, particularly to one able to carry out multiple sealing at the same sealing location of a plastic bag to achieve a quick and firm sealing work, installed together with a dot-cutting device to cut a dotted line near the sealing location of the plastic bag and with an opening-cutting device to cut an opening for the plastic bag to comparatively downsize a work table of the sealing device, greatly elevating economic gain.

2. Description of the Prior Art

A conventional plastic bag-sealing machine, as shown in FIGS. 1 and 2, includes a worktable 10 provided thereon with a material intake press roller 11. A guide roller 12 is positioned beside the material intake press roller 11, a silicon rubber roller 13 is provided near the guide roller 12, and a material outlet guide roller 14 is disposed beside the silica gel roller 13. A sealing device 15 is positioned opposite to the silicon rubber roller 13 and provided with a rotating shaft 16 having a sealing blade 17 fixed thereon. Plastic bags 19 are wound to pass around the material intake press roller 11, the guide roller 12, the silicon rubber roller 13 and the material outlet guide roller 14 orderly to be conveyed forward, and the sealing blade 17 is rotated together with the rotating shaft 16. When the sealing blade 17 is rotated for one round and contacts with the silicon rubber roller 13, as shown in FIG. 2, it will perform sealing at the sealing portion 18 of a plastic bag 19. When the sealing blade 17 is rotated together with the rotating shaft 16 for a circle, the plastic bags 19 will be conveyed by the material outlet guide roller 14 for a distance that is exactly equivalent to the length of a plastic bag 19, and when rotated for a second round and contacting with the silicon rubber roller 13 again, the sealing blade 17 will carry out sealing for another plastic bag 19. Such incessantly circulating movement enables the sealing machine 1 to perform sealing automatically. However, in order to tightly seal a plastic bag 19, the conventional plastic bag sealing machine 1 has to reduce the conveying speed of the plastic bags 19 and the rotating speed of the sealing blade 17 to enable the sealing blade 17 to stay longer at the sealing portion 18 of a plastic bag 19 for insuring firmness of the sealed line of the plastic bag 19, thus reducing sealing speed and producing speed of plastic bags. In addition, due to being sealed only one time by the sealing blade 17, the sealed location of a plastic bag is insufficient in strength, likely to cause disqualified products; therefore, the conventional plastic bag-sealing machine 1 is only applicable to comparatively thin plastic bags 19. Moreover, the conventional plastic bag-sealing machine 1 has all its components transversely disposed in a line on the worktable 10, taking too much space.

SUMMARY OF THE INVENTION

The objective of the invention is to offer a plastic bag sealing device able to execute sealing with quickness and with large strength for a plastic bag, combined together with a dot-cutting device and an opening-cutting device to respectively carry out dot-cutting and cutting so as to shrink its work table to greatly elevate economic gain.

The main characteristics of the invention are a work table, a sealing device fixed on the work table and having a silicon rubber roller, a material intake press roller and a material outlet press roller fixed beside the silicon rubber roller to press thereon, plural rotating shafts fixed outside around the silicon rubber roller and respectively mounted with a sealing blade, plural guide rollers fixed on the work table to conduct plastic bags, a dot-cutting device, a cutting device installed beside the dot-cutting device, and a press roller fixed beside the dot-cutting device and the cutting device. With the sealing blades to carry out multiple sealing at the same location, a plastic bag can be quickly and firmly sealed to step up economic gain, and with the dot-cutting device and the opening-cutting device installed on the work table to respectively execute dot-cutting and cutting, the whole process of manufacturing the plastic bag can be substantially downsized.

BRIEF DESCRIPTION OF DRAWINGS

This invention will be better understood by referring to the accompanying drawings, wherein:

FIG. 5 is a side view of the dot-cutting device and the opening-cutting device of the preferred embodiment of a plastic bag sealing device in the present invention;

FIG. 6B is an illustration of the plastic bag cut with dotted lines by the dot-cutting device of the preferred embodiment of a plastic bag sealing device in the present invention;

DETAILED DESCRIPTION OF THE PREFERRED EMBODIMENT

Figure 1:
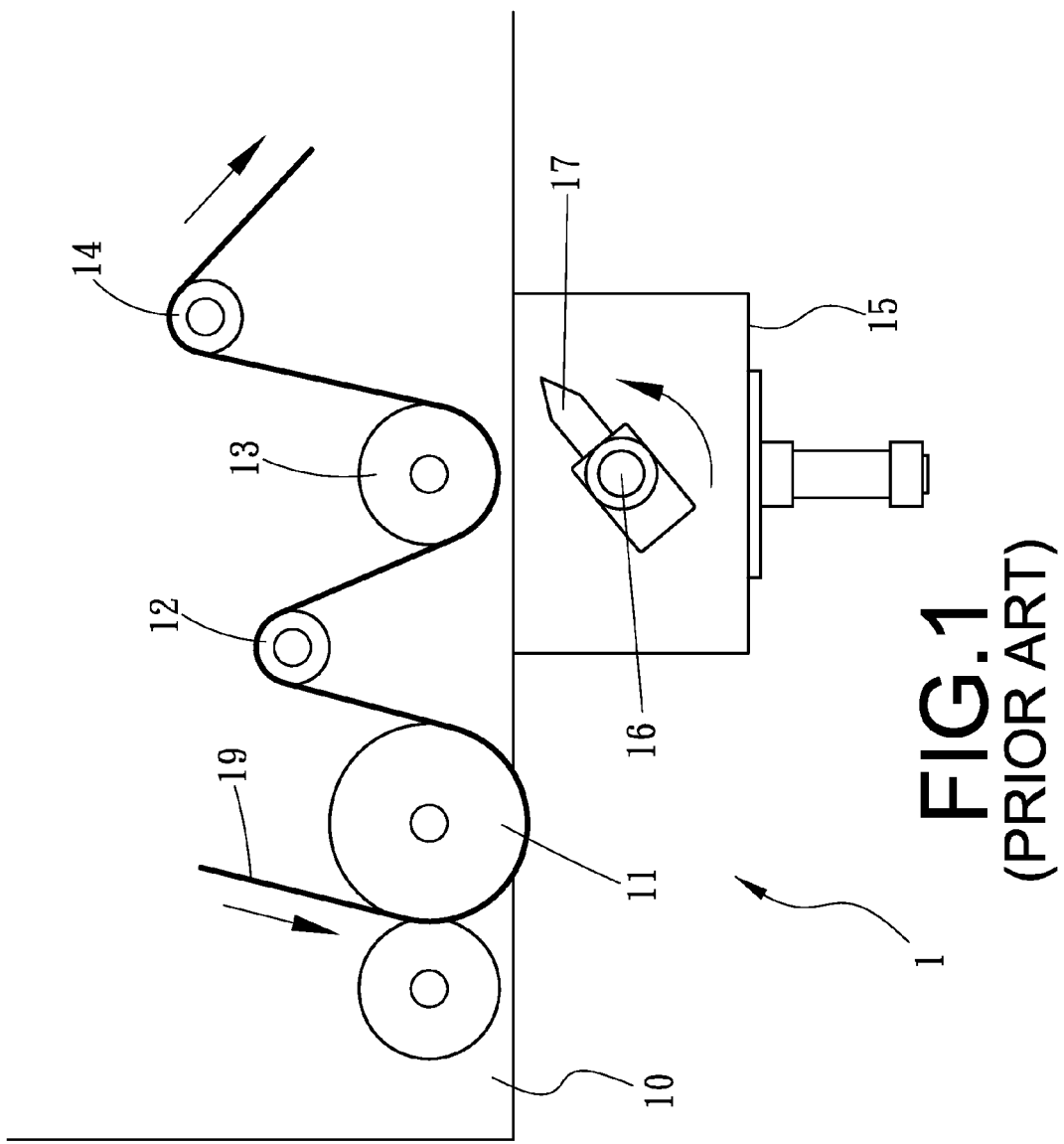
FIG. 1 is a flow chart of a conventional plastic bag sealing machine.
Figure 2:
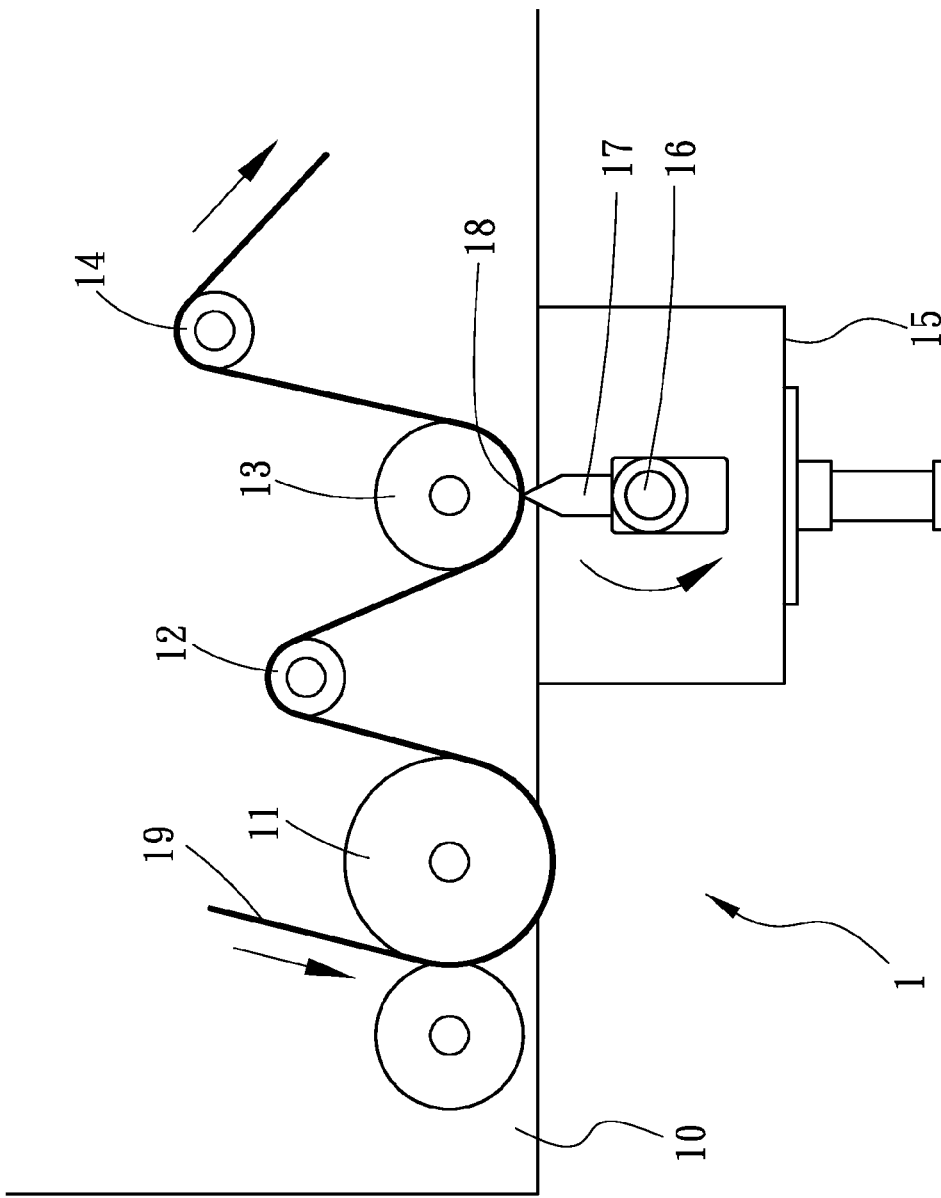
FIG. 2 is another flow chart of the conventional plastic bag-sealing machine.
Figure 3:
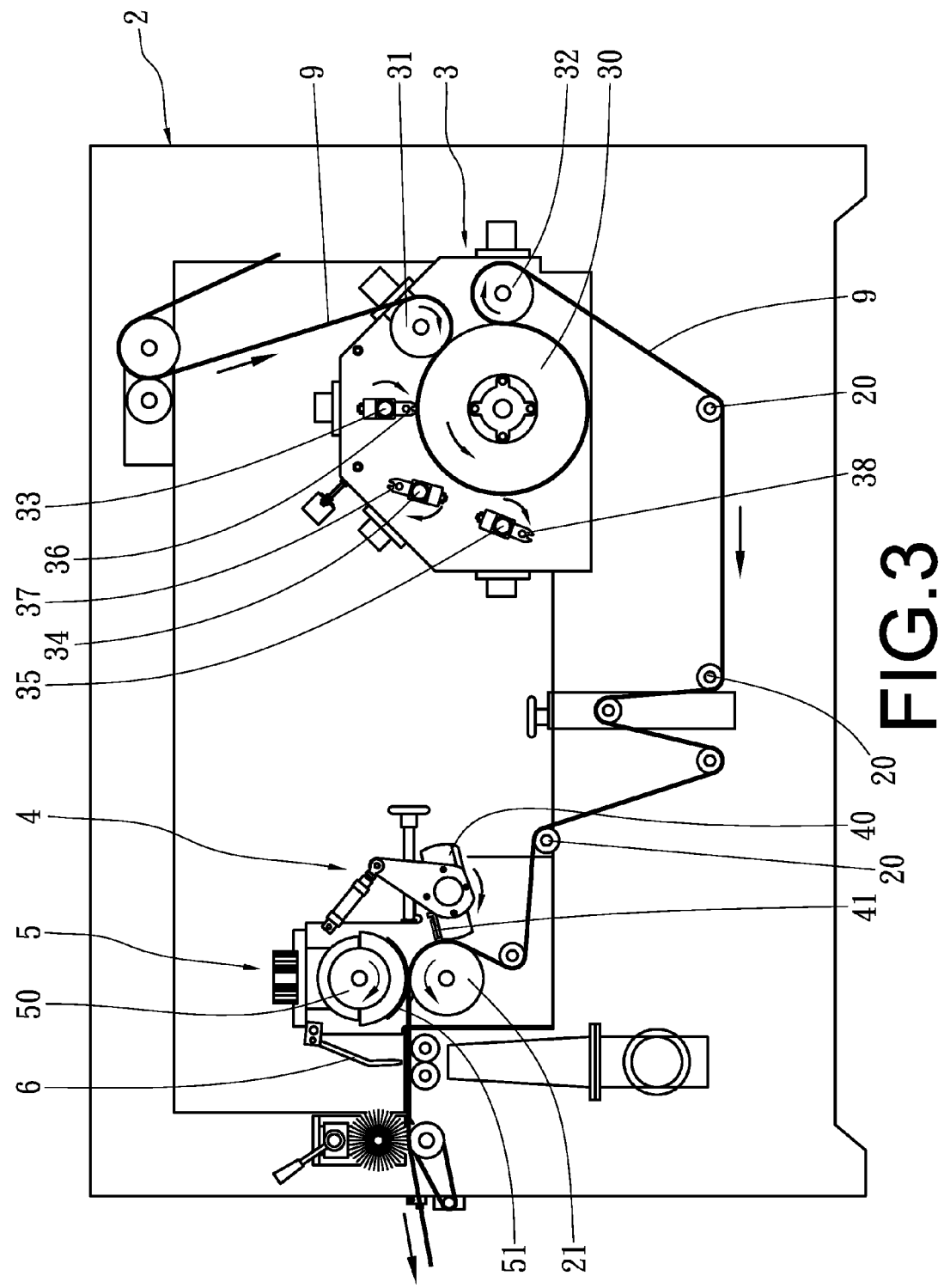
FIG. 3 is a flow chart of a preferred embodiment of a plastic bag sealing device in the present invention.
Figure 4:
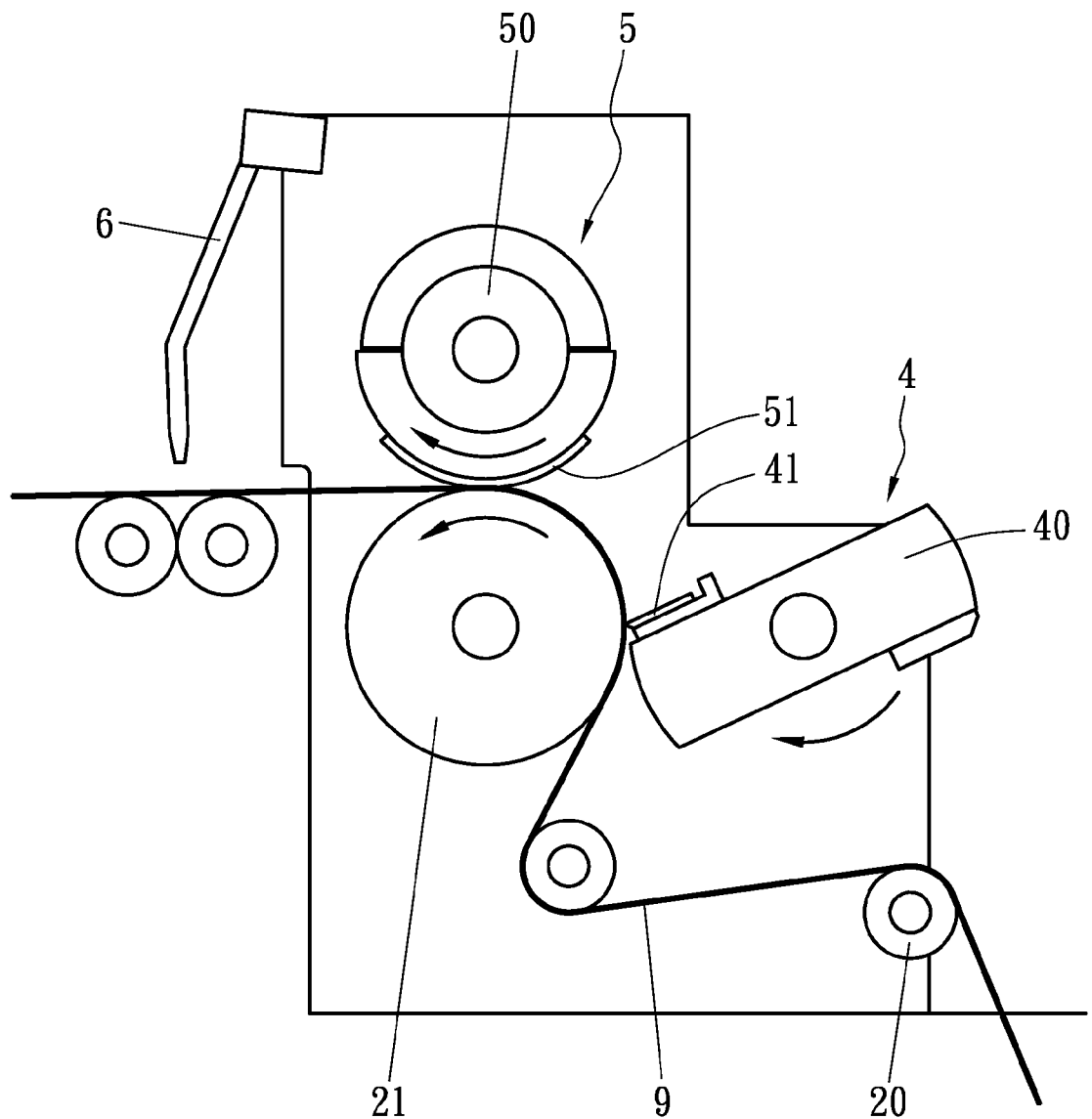
FIG. 4 is a partial magnified chart of a dot-cutting device and an opening-cutting device of the preferred embodiment of a plastic bag sealing device in the present invention.
Figure 6A:
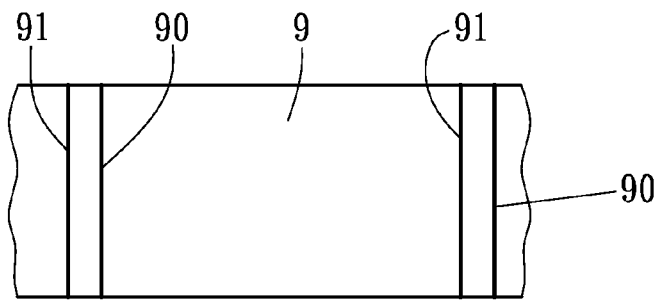
FIG. 6A is a view of a plastic bag sealed with sealing lines by a sealing device of the preferred embodiment of a plastic bag sealing device in the present invention.
Figure 6B:
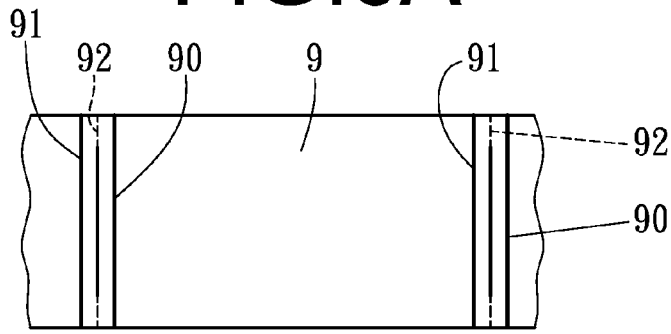
FIG. 6B is a view of the plastic bag cut with a dotted line
Figure 6C:
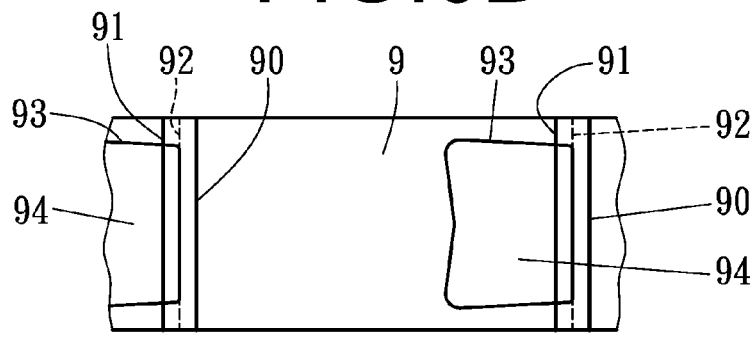
FIG. 6C is a view of the plastic bag cut with an opening by the opening-cutting device of the preferred embodiment of a plastic bag sealing device in the present invention.
Figure 6D:
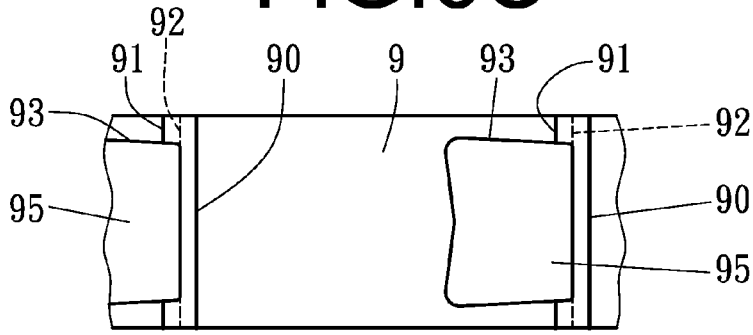
FIG. 6D is a view of the plastic bag finished by the preferred embodiment of a plastic bag sealing device in the present invention.

A preferred embodiment of a plastic bag sealing device in the present invention, as shown in FIGS. 3~5, includes a work table 2, a sealing device 3 and a dot-cutting device 4 installed on the work table 2, and a cutting device 5 and an air nozzle 6 as main components combined together.

The sealing device 3 is provided with a silicon rubber roller 30, a material intake press roller 31 and a material outlet press roller 32 installed to press on one side of the silicon rubber roller 30 and properly spaced apart each other. Further, a first rotating shaft 33, a second rotating shaft 34 and a third rotating shaft 35 are fixed outside the silicon rubber roller 30, spaced apart around the other side of the silicon rubber roller 30, and respectively fixed thereon with a first sealing blade 36, a second sealing blade 37, and a third rotating shaft 38. When the first, the second and the third sealing blade 36, 37 and 38 are rotated to contact with the silicon rubber roller 30 in due order, they will orderly and respectively carry out sealing at the same sealing portion of a plastic bag 9.

In addition, the work table 2 is provided with plural guide rollers 20 used to conduct the plastic bags 9, the dot-cutting device 4, the opening-cutting device 5 and the air nozzle 6 positioned aside the opening-cutting device 5.

The dot-cutting 4 is provided with a rotator 40 fixed with a dot-cutting blade 41.

The opening-cutting device 5 is installed at one side of the dot-cutting device 4, provided with a rotating shaft 50 that is fixed thereon with a blade 51. And installed beside the dot-cutting device 4 and the opening-cutting device 5 is a press roller 21.

In using, as shown in FIGS. 3~6, firstly, a sheet of continuous plastic bags 9 is wound through between the material intake press roller 31, the silicon rubber roller 30 and the material outlet press roller 32, orderly conveyed through between the material intake press roller 31 and the silica gel roller 30, around the silica gel roller 30, through between the material outlet press roller 32 and the silicon rubber roller 30, around the material outlet press roller 32 to further pass around each of the guide rollers 20 of the work table 2 and through between the press roller 21 and the dot-cutting device 4 and then out through between the press roller 21 and the opening-cutting device 5. When the plastic bag 9 is conveyed forward by the material intake press roller 31, the silicon rubber roller 30 and the material outlet press roller 32 in order, the first sealing blade 36 will be rotated together with the first rotating shaft 33. When the first sealing blade 36 closely contacts with the silicon rubber roller 30, as shown in FIG. 3, it will carry out first sealing at a sealing location on a plastic bag 9 to form two sealing lines 90 and 91, as shown in FIG. 6A. After being sealed, the sealing lines 90 and 91 of the plastic bag 9 will be continuously conveyed to the spot where the second sealing blade 37 is located, and meanwhile the second sealing blade 37 is rotated together with the second rotating shaft 34 to contact with the silicon rubber roller 30 and the first sealing blade 36 is rotated to leave the silicon rubber roller 30. Next, the second sealing blade 37 is actuated to perform second sealing at the sealing lines 90 and 91 of the plastic bag 9. After being sealed by the second sealing blade 37, the sealing lines 90 and 91 of the plastic bag 9 will be conveyed to the spot where the third sealing blade 38 is located, and simultaneously, the third sealing blade 38 is rotated together with the third rotating shaft 35 to contact with the silicon rubber roller 30, and the second sealing blade 37 is rotated to leave the silicon rubber roller 30. Successively, the third sealing blade 38 functions to carry out third sealing at the sealing lines 90 and 91 of the plastic bag 9, and after being sealed by the third sealing blade 38, the plastic bag 9 will be conveyed to the material outlet press roller 32 by the silicon rubber roller 30 and then sent out by the material outlet press roller 32, and the third sealing blade 38 will be rotated to leave the silicon rubber roller 30, thus finishing sealing work of the plastic bags 9. As soon as the third sealing blade 38 is rotated together with the third rotating shaft 35 to leave the silicon rubber roller 30, the first sealing blade 36 is again rotated together with the first rotating shaft 33 to contact with the silicon rubber roller 30 to carry out first sealing for another plastic bag 9. By repeating foresaid circulating movement, the plastic bag sealing device can continuously carry out sealing for the plastic bags 9. After being sealed with the sealing lines 90 and 91 spaced apart with a certain distance as shown in FIG. 6A, the plastic bag 9 is conveyed to the dot-cutting device 4 by the guide rollers 20 of the work table 2, and meanwhile the dot-cutting blade 41 of the dot-cutting device 4 is rotated to closely contact with the press roller 21 to carry out dot-cutting between the sealing lines 90 and 91 of the plastic bag 9 to form a dot-cutting line 92, as shown in FIGS. 4, 5 and 6B. The dot-cut plastic bag 9 is next conveyed to the opening-cutting device 5, and meanwhile the opening-cutting blade 50 is rotated to closely contact with the press roller 21 to cut an opening-cutting line 93 on the plastic bag 9, as shown in FIGS. 4, 5 and 6C. Then, the air nozzle 6 located beside the opening-cutting device 5 will strongly blow off a wasted material 94 surrounded by the opening-cutting line 93 to enable the plastic bag 9 formed with an opening 95, thus finishing a product of the plastic bag 9 as shown in FIG. 6D. The finished plastic bags 9 are rolled up by a rolling device fixed on one side of the work table 2 (not shown in the Figures). With the same sealing lines 90 and 91 of the plastic bag 9 sealed three times by the sealing device 3, the plastic bag 9 can be not only firmly and perfectly sealed with great strength, but also each sealing time can be shortened to save the total sealing. Moreover, with the dot-cutting device 4 and the opening-cutting device 5 installed on the work table 2, the plastic bag 9 can be done with dot-cutting and opening-cutting together with sealing work in a same process to greatly save its manufacturing time and elevate its capacity. In addition, the plastic bag sealing device in this invention is designed in a circular-motion type, taking less space and greatly enhancing economic gain.

While the preferred embodiment of the invention has been described above, it will be recognized and understood that various modifications may be made therein and the appended claims are intended to cover all such modifications that may fall within the spirit and scope of the invention.

What is claimed is:

1. A plastic bag sealing device comprising:
a work table (2);
a sealing device (3) provided with a silicon rubber roller (30), a material intake press roller (31) and a material outlet press roller (32) installed to press on one side of the silicon rubber roller (30) and properly spaced apart each other; a first rotating shaft (33), a second rotating shaft (34) and a third rotating shaft (35) are fixed outside the silicon rubber roller (30), spaced apart around the other side of the silicon rubber roller (30), and respectively fixed thereon with a first sealing blade (36), a second sealing blade (37), and a third rotating shaft (38); wherein the first, the second and the third sealing blades (36, 37 and 38) are rotated to contact with the silicon rubber roller (30) in due order, they will orderly and respectively carry out sealing at the same sealing portion of a plastic bag (9);
a dot-cutting device (4) provided with a rotator (40) fixed with a dot-cutting blade (41);
an opening-cutting device (5) installed at one side of the dot-cutting device (4), provided with a rotating shaft (50) that is fixed thereon with a blade (51);
a press roller installed beside the dot-cutting device (4) and the opening-cutting device (5);
an air nozzle (6) located beside the opening-cutting device (5);
a plurality of guide rollers (20) on the work table (2); for conducting plastic bags (9) to the dot-cutting device (4), the opening-cutting device (5) and the air nozzle (6) positioned aside the opening-cutting device (5);
wherein in using, a sheet of continuous plastic bags (9) is wound through between the material intake press roller (31), the silicon rubber roller (30) and the material outlet press roller (32), is orderly conveyed through an area between the material intake press roller (31) and the silica gel roller (30); and then transfers around the silica gel roller (30); the plastic bag (9) further passes through a section between the material outlet press roller (32) and the silicon rubber roller (30); and then passes around the material outlet press roller (32); and then the continuous plastic bag (9) is to further pass around each of the guide rollers (20) of the work table (2) and moves through between the press roller (21) and the dot-cutting device (4) and then move out of an area between the press roller (21) and the opening-cutting device (5);

when the plastic bag (9) is conveyed forward by the material intake press roller (31), the silicon rubber roller (30) and the material outlet press roller (32) in order, the first sealing blade (36), the second sealing blade (37) and the third sealing blade (38) will closely contact with the silicon rubber roller (30), the first sealing blade (36) will carry out a first sealing, a second sealing and a third sealing at a sealing location on a plastic bag (9) to form two sealing lines (90 and 91) three times; and after being sealed with the sealing lines (90 and 91) spaced apart with a certain distance, the plastic bag (9) is conveyed to the dot-cutting device (4) to carry out dot-cutting between the sealing lines (90 and 91) of the plastic bag (9) to form a dot-cutting line (92).

2. The plastic bag sealing device as claimed in claim 1, wherein an air nozzle is installed at one side of said opening-cutting device; and wherein the dot-cut plastic bag (9) is next conveyed to the opening-cutting device (5), and meanwhile the opening-cutting blade (50) is rotated to closely contact with the press roller (21) to cut an opening-cutting line (93) on the plastic bag (9); then, the air nozzle (6) located beside the opening-cutting device (5) will strongly blow off a wasted material (94) surrounded by the opening-cutting line (93) to enable the plastic bag (9) formed with an opening (95), thus finishing a product of the plastic bag.

* * * * *